Feb. 3, 1970  A. G. SYLVESTER ET AL  3,493,272
TOOL BAR CLAMP FOR AGRICULTURAL IMPLEMENTS
Filed Jan. 25, 1968
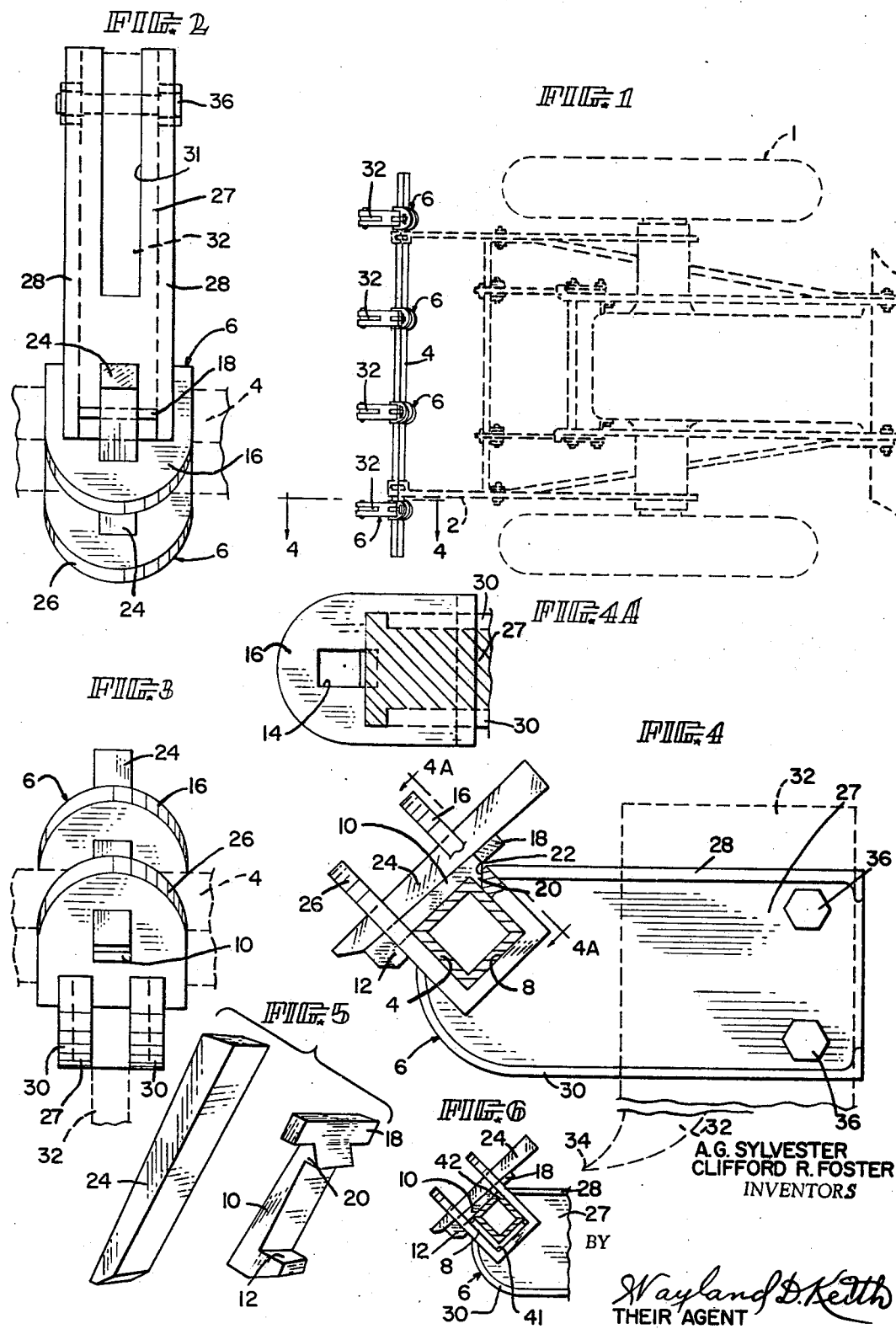
A.G. SYLVESTER
CLIFFORD R. FOSTER
INVENTORS
BY Wayland D. Keith
THEIR AGENT

United States Patent Office 3,493,272
Patented Feb. 3, 1970

3,493,272
TOOL BAR CLAMP FOR AGRICULTURAL IMPLEMENTS
Alfred Glenn Sylvester, P.O. Box 903, Avoca, Tex. 79503, and Clifford R. Foster, Avoca, Tex.; said Foster assignor to said Sylvester
Filed Jan. 25, 1968, Ser. No. 700,621
Int. Cl. A01b *15/02*
U.S. Cl. 306—1.5     12 Claims

ABSTRACT OF THE DISCLOSURE

A clamp for attaching plow shanks to a tool bar of an agricultural implement by the use of at least one wedge means which interengages with the clamp to hold the clamp against spreading of bifurcated portions of the clamp and to hold the tool bar against rotation. The clamp has an open throat which enables the clamp to be moved laterally onto the tool bar and to be secured thereon or removed laterally therefrom, after the removal of wedge means from openings within the flanges of the tool bar clamp. A projection extends outward from the tool bar clamp and may have an opening or slot therein to receive a plow shank therein. Provision is made to use a holding member in conjunction with the wedge means to positively interlock with the flanges of the clamp to prevent spreading of the bifurcated portions of the clamp and to interengage the tool bar to prevent rotation thereof. The holding member may be a complementary wedge member.

---

This invention relates to improvements in clamps for tool bars and more particularly to clamps which may be quickly attached to the tool bar, quickly detached therefrom or loosened with respect to the tool bar, so as to be movable therealong to enable various plow shanks to be attached thereto.

Various tool bar clamps have been proposed heretofore, but these, for the most part, had to be bolted into place, which required wrenches of given sizes, and, when the clamp had been in place over a long period of time and exposed to all types of weather, the threads of the bolts would become rusted, which made the removal of the clamp difficult and time consuming.

The present clamp is so designed that it may be attached to tool bars of various sizes and at any point along the length thereof, by wedgingly engaging the clamp thereon with a tap of a hammer, or it may be readily loosened, for removal from the tool bar, by the tap of a hammer, which greatly expedites the assembly tool bar clamps on agricultural implements which employ tool bars with a multiplicity of plow shanks. The present clamp is so constructed that it may be moved laterally onto a tool bar or the clamp may be moved laterally therefrom without removing the tool bar from the agricultural implement.

An object of this invention is to provide a tool bar clamp for the tool bar of an agricultural implement, which may be readily installed on the tool bar, adjusted with respect thereto or removed therefrom, with only the use of a hammer with which to perform the operation.

Another object of the invention is to proivde a tool bar clamp for the tool bar of an agricultural implement which clamp will wedgingly engage the tool bar in such manner as to transmit the torque exerted by a plow shank directly to a tool bar.

Still another object of the invention is to provide a clamp for the tool bar of an agricultural implement which clamp may be readily attached to tool bars of different sizes, by wedging engagement.

Yet a further object of the invention is to provide a tool bar clamp for an agricultural implement which will positively engage the tool bar to prevent relative rotation of the tool bar clamp with respect to the tool bar, when secured in place by wedging engagement.

Still a further object of the invention is to provide a tocl bar clamp to which a ripper shank may be attached to enable the conversion of a conventional planter or cultivator into a sub-soil plow with chisel type plows.

Yet another object of the invention is to provide a clamp for the tool bar of an agricultural implement which is simple in construction, which is practically universally adaptable for attachment to all agricultural implement tool bars, which use tool bars to enable the tilling implements to be used therewith, and which device is rugged in construction and sufficiently sturdy to withstand the severe use to which it will be subjected.

The present tool bar clamp is so designed that it may be passed laterally onto any tool bar which is rectangular in cross section, and a holding element which may be wedge shaped or non-wedge shaped fitted there against to give positive clamping action, when a wedge is driven into the apertures of the clamp to bindingly engage the holding element with the tool bar, and which tool bar clamp may be readily removed laterally from the tool bar by tapping the wedge to loosen the tool bar clamp with respect to the tool bar.

A tool bar of this construction is readily adaptable for attachment to practically all types of plow shanks thereto, either by bolting or by wedging engagement, however, for the sake of uniformity, the clamp is shown for attachment to a vertical plow shank. This is, however, a matter of illustration, and the plow shank can be angulated and made rectangular in cross-section, or of other cross-sectional shape, in accordance with the use to which the clamp is to apply.

While only two adaptations of this tool bar clamp have been shown, with respect to tool bars of different sizes, it is to be understood that various modifications and adaptations of the present clamp may be made to adapt the use of the clamp to a particular tool bar with which it is to be used.

An embodiment of this invention, together with a modification is shown in the accompanying drawings, in which like reference characters designate like parts in the several views thereof, in which:

FIG. 1 is a top plan view of a portion of a tractor shown in dashed outline, a tool bar attached thereto being shown in full outline, on which tool bar the present tool bar clamps are positioned;

FIG. 2 is a greatly enlarged top plan view of the tool bar clamp with a tool bar shown therein in dashed outline;

FIG. 3 is a rear elevational view of the tool bar clamp, showing the tool bar clamp attached to a tool bar, the tool bar being shown in dashed outline;

FIG. 4 is a sectional view taken on the line 4—4 of FIG. 1, looking in the direction indicated by the arrows, with parts broken away and with parts shown in section to bring out the details of construction, a ripper shank being shown in dashed outline as being bolted thereto, with parts being broken away and shortened;

FIG. 4A is a fragmentary, sectional view taken on the line 4A—4A of FIG. 4;

FIG. 5 is an enlarged, exploded view of the complementary engaging members, both being shown as wedges used for holding the tool bar against rotation and against lateral movement; and FIG. 6 is a fragmentary, elevational view similar to FIG. 4, but showing an adapter fitted therein to enable a smaller tool bar to be used with the tool bar clamp.

With more detailed reference to the drawing, the numeral 1 designates generally a tractor having conventional lifts or draw bars 2 mounted thereon, which lifts or draw bars are conventional and on which a conventional tool bar 4 is mounted. The conventional tool bar 4 is usually rectangular in cross-section, more specifically square, and is usually from 1¾ inches to 3 inches across the flats, and, for the sake of lightness, is usually made of a square tubular member, as will best be seen in FIGS. 4 and 6.

The present tool bar clamp is designated generally by the numeral 6, which clamp is so constructed as to enable it to be fitted on two or more sizes of tool bars, that is, if the tool bar is 3 inches across the flats, the body of the clamp 6 is bifurcated, as indicated at 8, to receive a tool bar 4, which bifurcation can be of a size to receive a 3-inch square tool bar therein. A first holding member, which may be a wedge as shown at 10, or it may be a holding member without being wedge shaped, has a right angle head 12 thereon, the elongated portion of which is dropped through rectangular apertures 14 in the upper flange member 16 and the lower flange 26 of the tool bar clamp 6, and the holding member 10 moves downward until the T-member 18 comes to rest on the upper side of the upper flange member 16. The holding member 10 is then moved toward the tool bar 4 within rectangular openings 14, and an outwardly projecting gib 20, which has one right angle face and one angulated face, will move into recess 22 in upper flange member 16, to fit into complementary relation within a recess, so when a wedge 24 is fitted into the rectangular apertures 14, the complementary faces of holding member 10 and wedge 24 will interengage. The wedge 24, when tapped downwardly, will force the right angle head 12 below the lower face of flange 26 on tool bar clamp 6, thereby forcing the right angle gib 20 into binding engagement with the upper face of squared tool bar 4. However, the angulated upper face of gib 20 will engage the complementary angulated face in the recess 22, so upon driving wedge 24 downward, the faces of gib 20 and head 12 will bindingly engage to draw the tool bar into close fitting relation between the right angle face of the gib 20 and the flange 26, with the outwardly extending lugs of T-member 18 engaging the upper face of the flange 16 and the right angle shoulder of head 12 will engage the lower face of flange 26.

The holding member 10 and wedge 24, when tapped into binding engagement will securely lock the tool bar 4, both against rotation and longitudinal movement, with respect to the tool bar clamp 6. The invention, as illustrated herein, shows complementary wedge angles on holding member 10 and wedge 24, which form first and second wedges, which wedges have relatively small degrees of taper, therefore, when the second wedge 24 is tapped into binding engagement with holding member or first wedge 10, it will remain in this position, against vibration and rugged use until it is tapped on the opposite end thereof to loosen the wedge, therefore, upon removal of the second wedge 24, the head or T-member 18 of the holding member may be tapped to move right angle shoulder of the gib 20 on the holding member or first wedge 10 out of engagement with implement tool bar 4, and when the projections of head 12 have been moved toward the opposite side of the rectangular apertures 14, from the tool bar 4, the head 12 may be readily lifted out of the rectangular apertures 14 and the tool bar clamp 6 may be removed laterally from the tool bar 4.

The tool bar clamp 6 has an outwardly extending projection 27, which is bifurcated and has ribs 28 and 30 therearound, which interconnect with the bifurcated body 8. The outwardly extending projection 27 is bifurcated, as indicated at 31, and is adapted to receive a plow shank 32 therein. The plow shank 32 extends downwardly and has a point 34 on the lower end thereof, which point may be of the type to perform sub-soil operations in the soil. The plow shank 32 in the present instance, is shown to be vertical, however, this may be angulated in accordance with the particular operation being performed. The outwardly extending projection 27 is transversely apertured to receive bolts 36 therethrough to secure the plow shank 32 in adjusted relation with respect to the projection 27.

While the elongated body of the holding member 10 has been shown to have a small wedge taper, the taper may be dispensed with, if desired, and the wedge 24 complementary engage a straight parallel face thereon, and the other wedge face thereof engage the opposite side of the apertures or in some instances, the holding member may be dispensed with and the wedge 24 engaging a flat face of the tool bar and the opposite side engaging the flange on the opposite side of the aperture.

MODIFIED FORM OF THE INVENTION

A modification of the invention is shown in FIG. 6, wherein the tool bar clamp 6 has a right angle shim member 41 positioned within the bifurcation 8 of the body of the tool bar clamp 6, on the lower side thereof, which enables a tool bar 42 to be used which is of lesser cross-sectional dimension than the tool bar 4. For instance, if the bifurcation 8 is of a size to normally receive a 3-inch tool bar, by the use of a shim 41, which is one-half inch in thickness within the bifurcation 8, the tool bar 42, of 2½ inch cross-sectional area, will be moved toward holding member or first wedge 10 and toward the upper side of the throat 8, so that the gib 20 on holding member 10 will engage the upper corner of tool bar 42 to prevent relative rotation, in the same manner as set forth for the above described form of the invention, with the right angle on head 12 engaging the lower outer face of flange 26, and the T-member 18 engaging the upper face of flange 16 to prevent the spreading of the flanges upon torque being exerted on the tool bar 42. The complementary wedge 24 is used with holding member 10 in the same manner as described in the aforementioned form of the invention.

While the invention has been shown and described in the preferred embodiment thereof, together with a modification, it is to be understood that changes may be made in the minor details of construction and adaptations made to different installations without departing from the spirit of the invention.

Having thus clearly shown and described the invention, what is claimed as new and desired to be secured by Letters Patent is:

1. A clamp to secure a plow shank to a tool bar of an agricultural implement, which clamp comprises;
   (a) a bifurcated body having spaced apart flanges,
      (1) said flanges being transversely apertured so the apertures will be in substantially transversely aligned relation,
      (2) said bifurcated body of said clamp being adapted to receive a tool bar therein,
   (b) a wedge adapted to pass through said transversely aligned apertures of said flanges and having a side thereof engaging a side of the tool bar, when the wedge is in one position,
   (c) a complementary wedge adapted to pass through the transversely aligned apertures of said flanges, to urge said first wedge into tight, binding relation with said tool bar, when said second wedge is fitted into place, and
   (d) an outwardly extending projection on said tool bar clamp to which a plow shank may be secured.

2. A clamp to secure a plow shank to a tool bar of an agricultural implement, as defined in claim 1; wherein
   (a) a head is formed on each end of said first wedge, which heads are spaced apart and are adapted to engage the respective outer faces of said flanges of said bifurcated body adjacent the transversely aligned apertures.

3. A clamp to secure a plow shank to a tool bar of an agricultural implement as defined in claim 2; wherein
   (a) said heads each have a right angle shoulder formed thereon in position to engage said respective outer faces of said flanges, when fitted into place on said bifurcated portion of said tool bar clamp.
4. A clamp to secure a plow shank to the tool bar of an agricultural implement as defined in claim 2; wherein
   (a) said heads on said first wedge extend outwardly at right angles with respect to each other.
5. A clamp to secure a plow shank to the tool bar of an agricultural implement as defined in claim 2; wherein
   (a) one of said heads is a T-shaped member and is wider than the width of one of the transversely aligned apertures.
6. A clamp to secure a plow shank to the tool bar of an agricultural implement, as defined in claim 2; wherein
   (a) one of the flanges of the bifurcated body has a recess formed therein, adjacent the inner face of said flange, and
   (b) said first wedge has a gib formed thereon, with a right angle shoulder thereon, which gib is adapted to fit within the recess, with the right angle shoulder thereof adapted to bindingly engage the tool bar when the tool bar is fitted within said bifurcated body.
7. A clamp to secure a plow shank to the tool bar of an agricultural implement, as defined in claim 6; wherein
   (a) said recess in said flange has an angulated face, and wherein
   (b) said gib on said tapered first wedge, opposite said right angle shoulder, has a complementary angle thereon, to complementally engage in said recess, when said heads of said first wedge are in abutting relation with the outside faces of the opposed flanges.
8. A clamp to secure a plow shank to the tool bar of an agricultural implement, as defined in claim 2; wherein
   (a) said bifurcated body has a rectangular bifurcation to complementally receive a rectangular tool bar,
   (b) said outwardly extending projection on said tool bar clamp having a bifurcation formed therein at a right angle to the bifurcation in said tool bar receiving body, and
      (1) said bifurcation in said shank attachment being apertured transversely therethrough to receive fastening members therethrough to secure a plow shank in fixed relation with respect thereto.
9. A clamp to secure a plow shank to the tool bar of an agricultural implement, as defined in claim 2; wherein
   (a) an angulated shim is received in the bifurcation of said body of said tool bar clamp to enable a tool bar of smaller cross-sectional area to be held in binding engagement with said wedges.
10. A clamp to secure a plow shank to a tool bar of an agricultural implement, which clamp comprises:
    (a) a bifurcated body having spaced apart flanges,
       (1) said flanges being transversely apertured so the apertures will be in substantially transversely aligned relation,
       (2) said bifurcated body of said clamp being adapted to receive a tool bar therein,
    (b) wedge means positioned through said transversely aligned apertures of said flanges and being in binding engagement therewith and engaging a side of the tool bar, when said wedge means is in one position to hold said clamp in fixed relation with respect to said tool bar, and
    (c) an outwardly extending projection on said tool bar clamp to which a plow shank may be secured.
11. A clamp to secure a plow shank to a tool bar of an agricultural implement, as defined in claim 10; wherein
    (a) a holding member adapted to be positioned within the transverse apertures intermediate said wedge means and the tool bar,
       (1) a laterally extending projection on each end of said holding member to fit in binding engagement with the opposed faces of said flanges when in one position, and
    (b) said wedge means which is adapted to be positioned transversely through said apertures adapted to bindingly engage said holding member with said tool bar when in one position.
12. A clamp to secure a plow shank to a tool bar of an agricultural implement, as defined in claim 11; wherein
    (a) one of said flanges having an angulated recess formed therein adjacent to and connecting with said aperture,
    (b) said holding member having a gib formed on a side thereof, one side of which gib is angulated to complementally fit the angulated recess in said flange, and
       (1) the opposite face of said gib being at a right angle to the body of said holding member and having the face thereof complementary with the lower side of said flange when in one position, to engage a corner of a tool bar when positioned therein.

References Cited

UNITED STATES PATENTS

| | | | |
|---|---|---|---|
| 506,654 | 10/1893 | Baldwin | 306—1.5 |
| 675,611 | 6/1901 | Schenck | 306—1.5 |
| 679,854 | 8/1901 | Miller | 306—1.5 |
| 781,031 | 1/1905 | Sturges et al. | 306—1.5 |
| 3,010,744 | 11/1961 | Hollis | 306—1.5 X |

REINALDO P. MACHADO, Primary Examiner

WAYNE L. SHEDD, Assistant Examiner

U.S. Cl. X.R.

172—694